Dec. 10, 1935.   H. C. HEATON   2,023,524
TRANSMISSION SYSTEM
Original Filed July 9, 1926   4 Sheets-Sheet 1
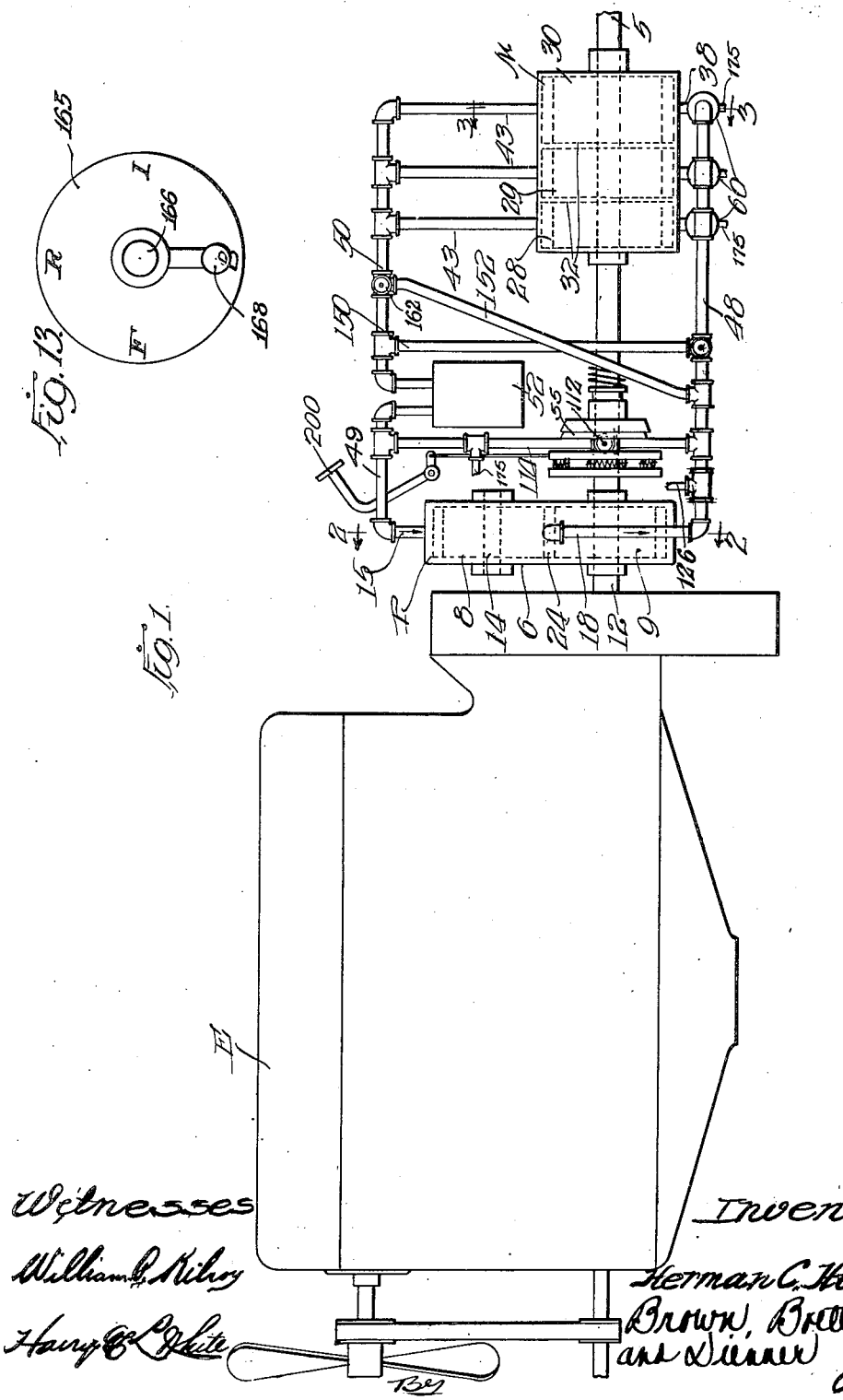

Dec. 10, 1935. H. C. HEATON 2,023,524
TRANSMISSION SYSTEM
Original Filed July 9, 1926 4 Sheets-Sheet 2
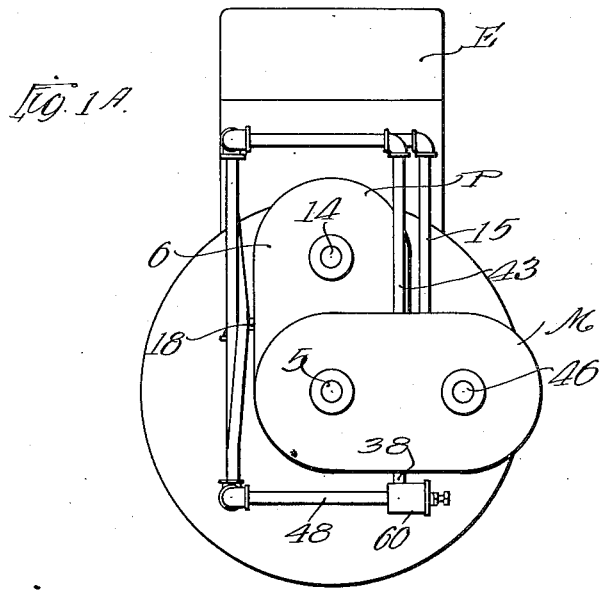
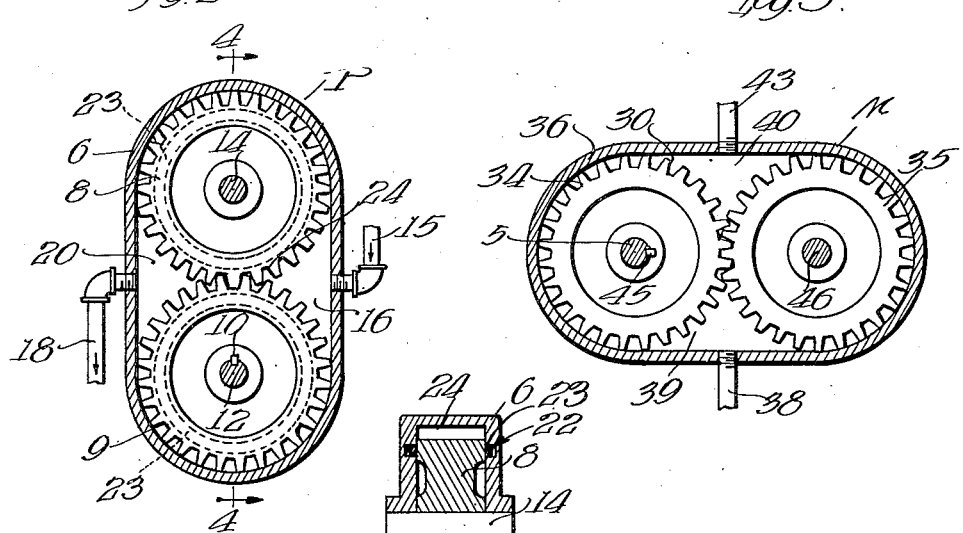

Dec. 10, 1935.  H. C. HEATON  2,023,524
TRANSMISSION SYSTEM
Original Filed July 9, 1926   4 Sheets-Sheet 3
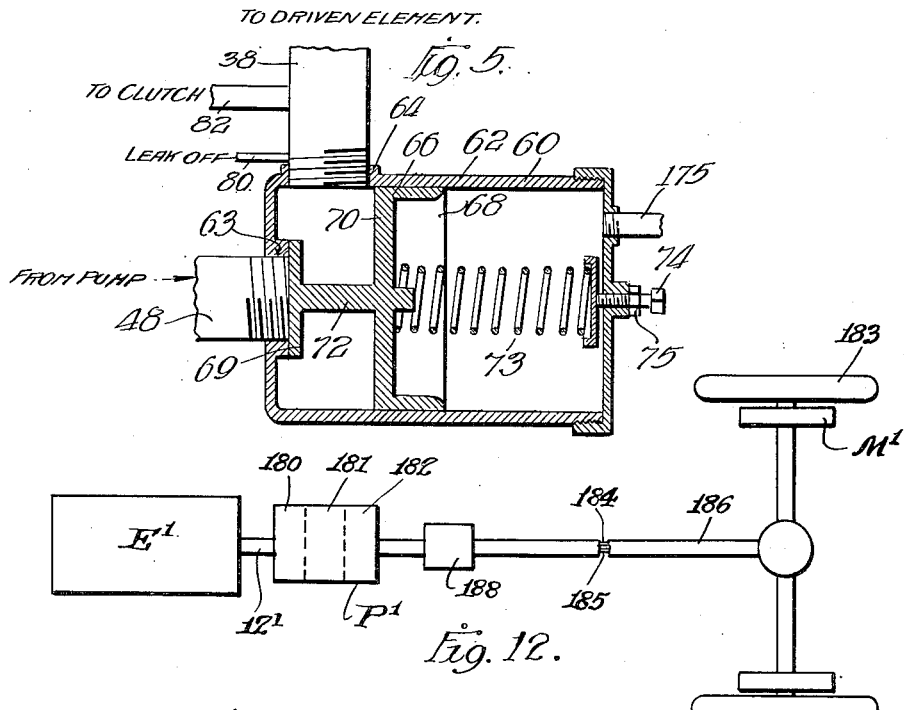
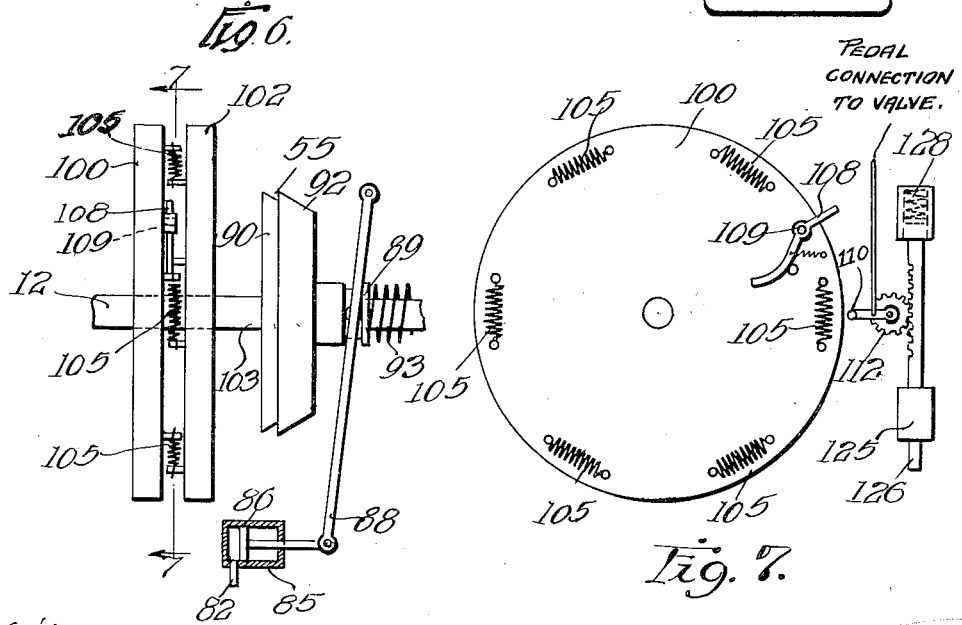

Dec. 10, 1935.    H. C. HEATON    2,023,524
TRANSMISSION SYSTEM
Original Filed July 9, 1926    4 Sheets-Sheet 4
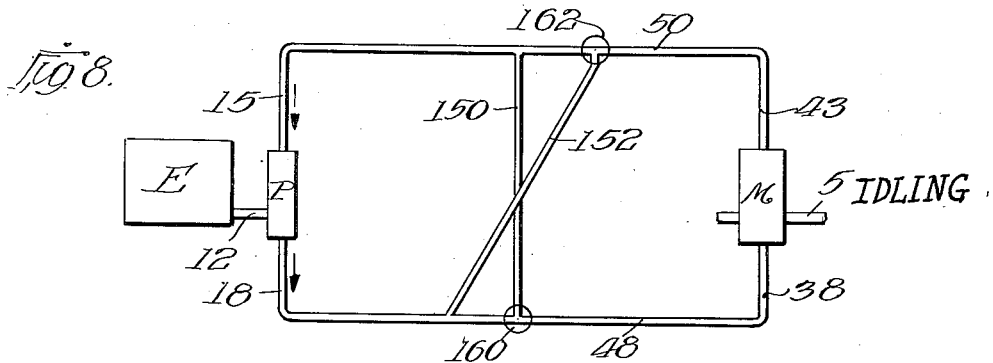
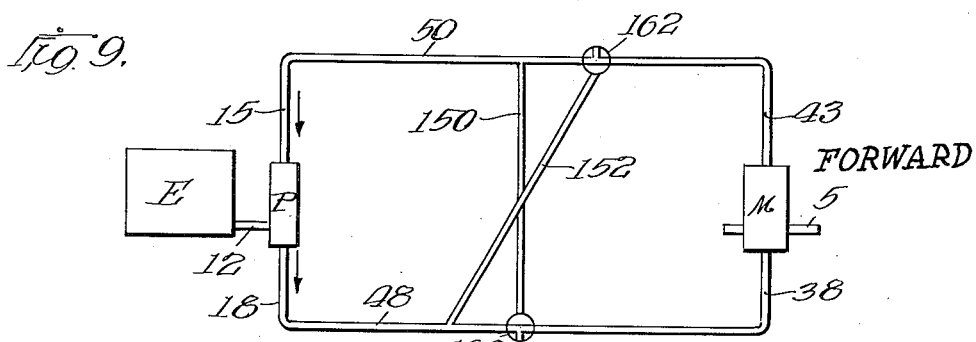
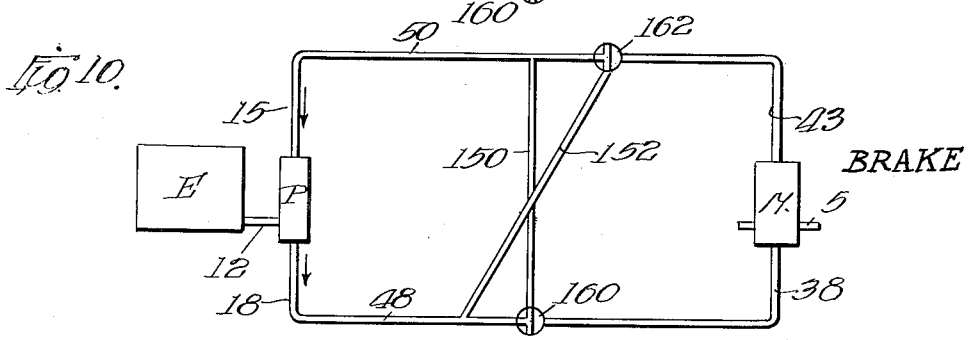
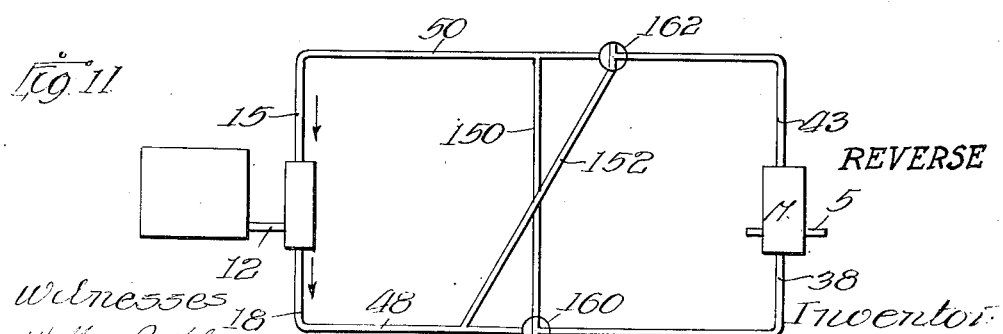

Patented Dec. 10, 1935

2,023,524

UNITED STATES PATENT OFFICE 2,023,524

TRANSMISSION SYSTEM

Herman C. Heaton, Kenilworth, Ill.

Application July 9, 1926, Serial No. 121,486
Renewed April 26, 1935

16 Claims. (Cl. 60—53)

This invention relates to transmission systems, and while it has particular utility with internal combustion engines for automotive use, it is to be understood that it is not limited to that purpose but may be employed with any prime mover with which it is found adaptable and wherever it is desired to transmit different torque applications and speeds to the driven element or elements from the prime mover.

The ordinary three-speed mechanical gear transmission with the necessity for manually shifting the gears from one speed to another, and requiring the throwing out of the clutch with each gear shift, has disadvantages and drawbacks even in automotive practice. Further, mechanical transmissions of the ordinary type are practically unsuited for locomotive and other applications of greater power.

According to my present invention, I provide for transmitting the power from the prime mover to the driven element or elements by means of fluid pressure and by varying the relative volumetric displacement between driving and driven units of the fluid system I provide for securing any desired range of speed and torque transmission. I also provide for varying the relative volumetric displacement automatically to vary the connecting ratio through the transmission automatically as the prime mover and driven element come up to speed and without the necessity of shifting gears or imposing other manual operations upon the driver or operator. This automatic change in relative volumetric displacement may be conveniently produced by the decreasing pressure in the fluid system corresponding to the torque as the engine comes up to speed, and, in this manner, the loading of the engine and the torque and speed range between the engine and driven elements is secured entirely automatically and always in the proper order without the necessity of the driver shifting gears to bring the vehicle gradually up to speed, as is now customary.

I also provide a direct mechanical connection which is made automatically at the desired point as the vehicle comes up to speed or as the torque or fluid pressure decreases and which thereafter forms a direct mechanical connection for transmitting the power to the driven element. Up to this point of direct mechanical connection, the power is transmitted exclusively by hydraulic means and this hydraulic transmission is automatically varied to properly load the engine and change the speed of power application to the driven element. After the direct mechanical connection is made, the power is thereafter solely mechanical until the hydraulic transmission is reconnected or the load increased to a point at which it is undesirable to continue further with the direct mechanical connection. At this point the increased load, encountered, for example, in taking a grade, causes an increase in torque which results in tripping of the mechanical connection, and consequently causes an increase in the fluid pressure in the fluid or hydraulic transmission, and at low speeds I provide for utilizing this increase to automatically bring in the minimum volumetric displacement of the hydraulic connection, automatically increasing this volumetric displacement as the load increases or continues of sufficient value to do so until the maximum displacement of the hydraulic transmission is effected, with a resulting low speed transmission to the driven element. This connection then continues until the load again decreases, whereupon the volumetric displacement of the hydraulic transmission again decreases with the decrease in torque, decreasing the relative speed of driving element to driven element and again finally effecting the direct mechanical connection automatically as the torque decreases sufficiently.

The change in volumetric displacement and accompanying speed changes may be made infinitely variable, and I provide means for securing a lag or pressure interval between the different hydraulic stages for the purpose of providing a definite progression in one direction without a dropping into one stage and a momentary rising back to the other stage in the automatic variation of the volumetric displacement of the system, that is, without the fluttering of those valves automatically controlling the system during momentary pressure variations in the fluid transmission.

To prevent release of the direct connection and bringing into action of the fluid or hydraulic transmission due to the increased oil pressures at higher speeds, means is provided for automatically holding the direct connection or any given hydraulic connection in at such times. As the speed drops, pressure increase from increased loads operates the device as above pointed out.

In the embodiment of the invention to be herein described, there is a pump, which is preferably a gear pump, and this pump is driven by the prime mover and delivers oil or other fluid under pressure to a series of hydraulic motor units which are suitably connected to the propeller shaft of the automobile or to the other element to which it is desired to impart the power.

The hydraulic motor unit may be of the nature of a gear pump with as many units as it is desired to provide stages of transmission, and these act as driven units which receive the oil or other fluid under pressure from the pump unit and are driven thereby with an accompanying power application to the propeller shaft.

This arrangement disposes the fixed volume displacement unit on the driving shaft and the variable displacement unit on the driven shaft. If desired, fixed volume displacement units might be disposed adjacent each wheel, and a variable displacement unit might be coupled with the driving shaft, this latter unit having its displacement varied in accordance with the torque as a function of the load to transmit variable pressures to the fixed units for varying the power transmitted to these units.

Spring loaded valves are contemplated for cutting the motor or driven units in and out as a function of the oil pressure from the pump. The oil pressure varies with the torque. As the engine comes up to speed the pressure drops, and the valves operate to automatically decrease the volumetric displacement of the hydraulic motor units, and this decrease in volumetric displacement is relied on to increase the speed transmitted to the propeller or driven shaft. As the last of the hydraulic driven units is cut out, a suitable direct connection is automatically thrown in. The direct connecting means is arranged to automatically release again and bring the hydraulic connection into operation upon an increase in torque, as for example, in taking a grade.

Reversing is effected by reversing the direction of delivery of the fluid from the driving or pump unit to the driven or hydraulic motor unit and for the purpose of disconnecting the prime mover and the propeller shaft, the fluid may be freely by-passed around the pumping unit. Suitable means conveniently accessible to the dr'ver, as for example, on the steering column, are provided for conveniently controlling the system, and I provide also for securing a braking action through the hydraulic system.

I also provide various adaptations of the invention and in order to acquaint those skilled in the art with the manner of constructing and practicing the invention, I shall now describe a specific embodiment of the same in connection with the accompanying drawings, in which Fig. 1 is a more or less diagrammatic side elevation of a system embodying my invention;

Fig. 1A is a more or less diagrammatic end view of the system shown in Fig. 1;

Fig. 2 is a vertical section through the pump on the line 2—2 of Fig. 1;

Fig. 3 is a vertical section through one of the motor units on the line 3—3 of Fig. 1;

Fig. 4 is a vertical axial section through the pump on the line 4—4 of Fig. 2 showing an improved packing provision for the pump and motor units;

Fig. 5 is an enlarged detail section of the hydraulic motor governing valve for the last stage of the motor unit showing the same provided with a clutch control for effecting the direct mechanical connection between the prime mover and the driven or propeller shaft;

Fig. 6 is an enlarged fragmentary and more or less diagrammatic side elevation of the direct mechanical clutch connection shown in Fig. 1;

Fig. 7 is a section taken on the line 7—7 of Fig. 6;

Figs. 8, 9, 10 and 11 are diagrammatic views showing the different stages of operation of the system;

Fig. 12 is a more or less diagrammatic view of another embodiment of the invention; and Fig. 13 is a more or less diagrammatic view of a selector dial arrangement for controlling the system.

In the particular embodiment of the invention selected for illustration, E designates the prime mover here shown as an internal combustion engine, P designates a pump suitably connected to be driven by the engine, and M designates the fluid motor which is driven by fluid under pressure supplied from the pump P and which is suitably connected to drive the shaft 5 which may be the propeller shaft of the automobile, for example.

To the end of imparting a clear understanding of the invention without burdening the drawings or description with immaterial details, the showing is, wherever possible, more or less diagrammatic and in the description only general reference will be made to such details as are immaterial or will be apparent to those skilled in the art.

The pump P comprises a suitable enclosing casing 6 in which are any suitable pump gears 8 and 9. It is to be understood that the particular gear arrangement and details of the pump may be varied as desired and the casing 6 formed to properly accommodate the same. In the arrangement shown, the gear wheel 9 is keyed, as shown at 10, on the shaft 12. The shaft 12 is shown as the engine shaft, but it may be any other suitable or preferred driving shaft. The other gear wheel 8 may be loose on the shaft 14.

A conduit 15 opens through the casing 6 into the inlet side 16 of the pump and a conduit 18 leads from the outlet side 20 of the pump as shown in Fig. 2. As will be well understood, the gear pump P forces the oil or other fluid in the system from the inlet side 16 of the pump to the outlet side 20 and out through the outlet conduit 18.

For the purpose of packing the pump against leakage, the ends of the pump casing 6 may be provided with annular grooves 22 accommodating annular packing rings 23 compressed axially along the shafts 12 and 14 and forced into engagement with the faces of the gears 8 and 9 just inwardly of the gear teeth 24 as by means of suitable springs 25.

The motor unit M is shown as comprising a plurality of pairs 28, 29 and 30 of meshing gear wheels substantially similar to the gear wheels 8 and 9 of the pump P. The gear units 28, 29 and 30 may be separated against intercommunication by suitable separating means 32, as shown in Fig. 1. Each gear unit 28, 29 and 30 comprises, as shown in Fig. 3, a pair of intermeshing gear wheels 34 and 35 enclosed in the casing 36. These gears may optionally be provided with packing rings or other sealing means within the scope of the present invention, as shown in connection with the pump gears, although I have found that this is not necessary with some types of motor units. A conduit 38 opens through the casing 36 into the side 39 of each gear unit 28, 29 and 30 of the motor M. In the arrangement shown, there are three gear units 28, 29 and 30 in the motor M and, therefore, three pipes 38, but this may be decreased or infinitely increased. The sides 39 of the units 28, 29 and 30 form the inlet sides in the normal forward running of the vehicle and in the normal forward running the outlet sides are designated at 40 in Fig. 3, there being one of these for each gear unit 28, 29 and 30 and a pipe or conduit 43 leading from each of the sides 40.

As already pointed out, each of the gear units 28, 29 and 30 of the motor M is substantially similar to the pump gears 8 and 9 with the exception that instead of forcing the oil or other fluid in the system from the inlet side out through the outlet side, they receive the oil or other fluid under pressure from the pump P through their inlet sides and are driven thereby and the discharging oil is exhausted through the outlet sides 40.

The gear units 28, 29 and 30 of the motor or driving unit M may be of the same size or they may be of different sizes as shown in Fig. 1. In either event, when in the operation of the system the discharge of oil or other fluid from the pump P is delivered to all three of the units 28, 29 and 30, the volumetric displacement of the system is greatest and the speed transmitted to the driven shaft 5 is therefore least. By closing off communication between the delivery from the pump P and one of the units of the motor M, for example the unit 30, the volumetric displacement of the system is decreased and the speed transmitted to the shaft 5 is correspondingly increased. Then by cutting off communication to the second unit 29 the volumetric displacement is further decreased and the speed transmitted to the shaft 5 is further increased. The connections of these units to the pump P are automatically controlled, as will be hereinafter pointed out, and when the last unit 28, for example, is disconnected from the pump P a direct driving connection between the driving shaft 12 and the driven shaft 5 is adapted to be automatically thrown in.

The gear wheels 34 of the units 28, 29 and 30 are all keyed, as shown at 45 in Fig. 3, on the driven shaft 5, which, as already pointed out, may constitute the propeller shaft of a motor vehicle, for example. The gear wheels 35 may be loose upon the shaft 46.

The discharge conduit 18 from the pump P is connected with the delivery conduit 38 to the driving units 28, 29 and 30 by means of a conduit connection 48. The exhaust or discharge conduits 43 from the driven units 28, 29 and 30 are shown in Fig. 1 as connected with the inlet conduit 15 to the pump P through conduits 49 and 50 between which may be interposed, for example, a suitable reservoir 52 for maintaining a proper supply of oil or other fluid in the hydraulic transmission system at all times.

The clutch for providing a direct mechanical connection between the engine or driving shaft 12 and the driven or propeller shaft 5 is designated more or less generally at 55 in Figs. 1 and 6. This clutch is automatically disconnected whenever there is a supply of oil or other fluid to the driven unit M and as the last hydraulic driven unit is cut out, the clutch 55 is automatically engaged and provides a direct mechanical connection between the shafts 12 and 5.

Each driven unit 28, 29 and 30 is provided with a hydraulic governing valve for governing the fluid supply to the driven units automatically as a function of the load upon the engine. These valves are designated at 60 and in that they are all substantially alike with the exception of a clutch control connection from the valve associated with the unit 28 which is cut out last, a detailed description of the valve 60 associated with the unit 28 will suffice for all.

Each valve 60 comprises a cylindrical casing 62 having an inlet 63 and an outlet 64. The conduit 48 is suitably connected with and opens into the inlets 63 and the outlets 64 are suitably connected with and open out through the conduits 38 which lead to the gear units 28, 29 and 30. Reciprocable within the cylinder 62 is a piston 66 with rim 68 so shaped as to keep the piston 66 properly aligned and to prevent it from binding or getting cocked in the cylindrical casing. The piston valve 66 is in the nature of a differential or relay valve in that it comprises the disc or valve element 69 cooperable with the inlet 63 and a pressure surface 70 connected to the disc 69 as through a suitable connecting stem 72. A spring 73 tends to close the valve element 69 upon the inlet 63. The tension of the spring 73 may be adjusted by a screw 74 which may be locked in adjusted position by a suitable lock nut 75.

The springs 73 for the respective units 28, 29 and 30 are set to open and close at different pressures, the valve to the unit 28 for example opening first and closing last, the valve for the unit 29 opening second and closing next to the last, and the valve for the unit 30 opening last and closing first. These valves may be set, for example, to open at evenly distributed periods over the pressure variation cycle in bringing the vehicle up to speed or otherwise, as desired.

When the pressure in the pipe or conduit 48 becomes greater than the pressure of the spring 73 holding the disc 69 against its seat on the inlet 63, the disc 69 is moved inwards opening the inlet to the valve cylinder and permitting the establishment of a flow of fluid from the conduit 48 into the cylinder and out through the conduit 38 to the drive units 28, 29 or 30 associated therewith. Owing to the fact that the piston surface 70 is larger than the disc 69 and to the fact that the inlet pressure upon opening the valve acts upon the larger disc 70 to hold it open against the tension of the spring 73, the valve 69 remains off its seat until the pressure drops below that pressure which raised or lifted it from its seat. A time lag or interval is thereby provided in the operation of the valve to prevent fluttering or opening and closing of the same with momentary pressure variations in the system. That is, the valve will remain off its seat until the pressure drops to a point at which the product of it and the greater area of the surface 70 is substantially equal to the product of the area of the disc 69 and the greater pressure which opened the valve from its seat and any desired lag or interval of this sort may be provided by suitably proportioning the areas of the discs 69 and 70.

The conduit 38 leading to the driven unit 28 from its associated valve 60 is provided with a leak-off 80 so that the instant the valve associated with the unit 28 seats to close the inlet 63 the pressure is reduced to zero through the leak-off 80 and there is no pressure maintained on the line 82 leading to the clutch 55.

The leak-off 80 may lead to the fluid reservoir 52 and the conduit or pipe 82 leads to a hydraulic cylinder 85 associated with the clutch 55. The hydraulic cylinder 85 has a piston 86 which takes the place of the foot action which depresses the clutch pedal in the conventional type of equipment. This piston 86 is connected through lever 88 and a collar 89 to automatically disengage the clutch elements 90 and 92 of the clutch 55 whenever the fluid delivery to the hydraulically driven element M is opened. To this end the connection 82 is therefore made from the driven element 28 which opens first and closes last, so that the direct connection clutch 55 is automatically disengaged the instant the element 28 comes into action and remains disengaged until the element 28 is disconnected. The instant the piston 66 associated with the element 28 seats the pressure in the conduit 38 is reduced to zero through the leakoff 80 and there being no pressure maintained on the line 82 to the hydraulic clutch cylinder 85, the clutch is automatically engaged or thrown in as by means of a suitable spring 93.

I also provide for preventing disengagement of the direct connection clutch 55 by increased oil or fluid pressures at high speeds. The disengagement of the clutch 55 is thereby made automatic with the variations in oil pressure which accompany variations in torque or load only, and the clutch may continue operating unaffected by fluid pressure increases resulting from increased or excessive speeds of the vehicle.

Referring now to Figs. 6 and 7, a wheel 100 is keyed to the pump shaft 12 and a wheel 102 is keyed to another shaft 103 in line with and abutting the pump shaft 12, the driving effort being imparted from the wheel 100 to the wheel or member 102 through a series of springs 105 so arranged that the greater the load the greater the angular displacement between the wheels or members 100 and 102.

There is a dog or movable finger 108 carried on the wheel or member 100, this dog or finger 108 being pivoted or supported by a pivot 109 parallel to the shaft. The dog or finger 108 is so arranged that as the wheels or members 100 or 102 move or turn with respect to each other, the finger 108 is moved in or out with respect to the rim or periphery of the wheel or member 102. Obviously, the outward movement of the finger 108 is a function of the load and under considerable load where the relative movement between the members 100 and 102 is greatest, it moves out to the point where it trips a lever 110 which forms the handle or control element of a valve 112. The valve 112 is interposed in a by-pass 114 connecting the outlet from the pump P directly with the inlet thereto. When the by-pass 114 is opened, it permits the oil or other fluid to freely by-pass around the pump and there is not, therefore, at that time any appreciable transmission through the fluid transmission units 28, 29 and 30. The valves 60 are all closed at this time and the leak-off 80 removing any pressure tendency from the line 38 of the valve 60 associated with the driven element 28 at this time, there is no fluid clutch disengaging pressure applied to the clutch and it is in driving engagement and transmits the driving effort from the engine shaft directly to the driven or propeller shaft.

However, when the load between the members 100 and 102 becomes such that it swings the finger 108 beyond the periphery of the wheels 100 and 102, it trips the lever 110 and closes the by-pass 114 around the pump P. Upon automatically closing the by-pass 114 as a function of the load in this manner, oil is instantly forced into the inlets to the units 28, 29 and 30, assuming, of course, that the control valves of the system are set for normal forward running as will be hereinafter explained. The units 28, 29 and 30 thereupon automatically perform their functions as needed. If the load is great or at least sufficient to create a fluid pressure in the system which will open all of the valves 60, they are all opened and the slow speed transmission is imparted to the shaft 5. As the load decreases, the valves automatically cut out the units 30, 29 and 28 until the direct driving connection is again automatically brought into operation. If, upon closing the by-pass 114, the load is just sufficient to open two of the units 28 and 29, a further increase in the load thereafter will open the other unit and a decrease will cut out first one and then the other until the direct driving connection is brought into operation.

As already pointed out, instantly with the connection of the first unit 28 an oil pressure is set up through the line 82 associated with the valve 60 of this unit and this opens or disconnects the friction clutch 55 which is connected between the wheel or member 102 and the shaft 5 or other mechanism to be driven. When, as above stated, oil through the pipe 82 opens the clutch 55, the load on the springs 105 which connect the members 100 and 102 is instantly released and the finger 108 returns to its original position within the periphery of the discs or members 100 and 102.

There is a hydraulic cylinder 125 (Fig. 7) suitably connected with the pressure side of the fluid system by a conduit 126 and the piston in the cylinder 125 is opposed by a spring 128 in such a manner that when the pressure in the cylinder 125 gets very low under decreased or substantially no load, the spring 128 returns the finger 110 to its original position which opens the by-pass 114. Simultaneously, the oil pressure from the pipe or conduit 82 is reduced and permits the clutch 55 to close or engage and the motor or engine E is then driving the mechanism by direct mechanical action and the by-pass around the oil pump B is wide open.

From the foregoing, it will be apparent that the relative angular displacement or rotation between the members 100 and 102 is a function of the torque occasioned by the load and not a function of the speed of transmission. The provisions of Figs. 6 and 7 automatically bring the hydraulic transmission into action at increased loads and automatically vary the hydraulic transmission with variations in the load. Pressure increases in the fluid system at increased or excessive speeds of the engine E are simply by-passed around the pump P through the by-pass 114 without bringing the hydraulic transmission into action or varying the speed transmision therethrough, the bringing of this transmission into action being preferably as a function of the load only as described.

With the system set for forward running with the direct mechanical connection transmitting the drive to the rear wheels, when a grade, for example, is encountered the load immediately increases. When the increase is sufficient, it causes sufficient relative movement in the members 100 and 102 to close the by-pass 114 and the hydraulic reduced speed connection is thereby automatically brought into action and the direct connection automatically opened simultaneously therewith through the pressure line 82. If the grade increases, more and more of the elements of the unit M are automatically brought into operation and as the load decreases these elements are automatically cut out as functions of the decreasing pressure in the system until the last element 28 is cut out and the direct mechanical connection again brought automatically into operation.

The elements 100 and 102 and associated connections show means operable as a function of the load to bring the hydraulic connection into action with increased oil pressures in the system, which increased pressures are a result of increased loads, and which does not bring the hydraulic transmission into action with increased pressures produced by excessive speeds of the engine. This particular means may, of course, be varied.

When the direct mechanical connection is in use, it is necessary that some means be provided for preventing its disconnection when the engine is running at excessive speeds for fast driving, and I have provided for this by making the inner arm of the finger 108 of sufficient mass and size so that it substantially outweighs the outer portion of the finger. Thus, when the disc 100 is rotated at high speeds during the direct mechanical drive in a counterclockwise direction, as viewed in Figure 7, the centrifugal action will force the inner portion of the arm outwardly against the resistance of the spring, and consequently force the tripping portion 108 of the finger into the periphery of the disc, where it will thus be out of tripping position even though the torque may be substantially increased because of the rapid speed of the vehicle.

For the purpose of securing the reverse, idling and forward running conditions of the system, a pair of conduits 150 and 152 are connected between the conduits 48 and 50 between the pump P and the driven unit M. These connections and the four different operating conditions of the system are shown diagrammatically in Figs. 8, 9, 10 and 11.

In these figures the by-pass 114 around the pump is omitted for the purpose of clarity and ease of understanding as is the reservoir 52, the control valves 60 and the direct mechanical and associated connections. Certain elements shown in the other figures are also omitted from Figure 1 for the same purpose. The element M is also illustrated as merely comprising one unit, but this is for the purpose of describing the operating conditions and setting of the system only. As shown in these figures at the connection of the conduit 150 with the conduit 48, there is a 3-way valve 160 and at the connection of the conduit 152 with the conduit 50 there is a 3-way valve 162.

The valves 160 and 162 may be set manually from the operator's or driver's position in the vehicle as by means of a setting arm 168 (Fig. 14) which may be rotatably mounted upon the upper end of the steering column 166. The dial 165 has the reverse, forward, idling and braking markings as indicated in Fig. 14, and the arm 168 is adapted to be selectively moved into registration with any of these markings.

When the setting or control arm 168 is turned into register with the position I, the valves 160 and 162 are set thereby into the positions shown in Fig. 8. Thereupon, the discharge or delivery from the pump P which is out from the conduit 18 in the direction indicated by the arrows, is adapted to by-pass freely through the conduits 150, 152 and 15 back to the pump and, at the same time, the motor unit M is by-passed around itself and adapted to run freely without creating any oil pressure therein at this time. The vehicle is then in its idle or coasting condition.

By turning the arm 168 to register it with the position F, the valves 160 and 162 are set in the positions shown in Fig. 9. The by-pass from the pump P is thereupon closed and the delivery from the pump is supplied to and drives the motor unit M, the discharge from the motor unit being delivered back to the pump and the drive being transmitted through the hydraulic transmission at this time, and until automatically varied or interrupted as already explained.

When the arm 168 is turned to register it with the position R, the valves 160 and 162 are set in the positions shown in Fig. 11, which is the reversing condition of the vehicle. At this time the pressure fluid from the pump P is delivered through the conduit 152 to the opposite side of the motor unit M, discharging through the opposite side of the motor unit M and back through the conduit 150 to the inlet side of the pump. The pressure application through the driven unit is thereby simply reversed to reverse the direction of drive to the shaft or driven element 5.

Upon reversing the flow of liquid thru the system, the fluid enters the valves 60 thru the conduits 38 (Figure 5) and acting upon the larger surfaces 70 opens the valves for the reversed fluid flow against the tension of springs 73 and against the pressure action on the smaller surfaces 69 from the inside.

To prevent opening of the valves 60 under increased fluid pressures caused in the system by increased or excessive engine speeds, the by-pass 114 (Figure 1) may be connected by means of a conduit 175 (Figures 1 and 5) with the opposite end of the cylinder of each valve 60. The by-pass 114 is opened at increased or excessive speeds and upon being opened the pressure supplied to the valves 60 through the connections 175 acts upon the surfaces 70 of greater area and cumulatively with the spring 73 to hold the valves closed and against opening under the same increased pressure acting upon the smaller surfaces 69 through the inlets 48.

When the dial 165 is set with the mark B in register with the arm 168, the valves 160 and 162 are set in the positions shown in Fig. 10. With these valves in this position, the pressure discharge from the pump is by-passed through the conduits 150 and 152 back to the pump, but the inlet and outlet sides of the motor unit M are closed against any such by-pass action at this time. The result is that the rotation of the propeller shaft with the rear wheels builds up a fluid pressure in the motor or driven unit end of the system through the gear unit of the motor M, and this pressure, or at least the opposition which it produces to the rotation of the gears 34 and 35 of the respective driven units 28, 29 and 30 produces a braking action on the propeller shaft which may be advantageously employed for braking the rear wheels.

As already pointed out, the plural unit M may constitute the driving unit and the single fixed unit P may constitute the driven unit of the system.

In Fig. 13, for example, I have shown an oil pump on the shaft 12' of the engine E', this oil pump P' comprising a plurality of units 180, 181 and 182 supplying oil or other fluid under pressure to the single hydraulic motor units M' at the wheels 183 of the vehicle. The tube 186 contains the oil supply and oil return conduits 184 and 185 and a suitable reversing valve is provided at 188 for reversing the direction of fluid pressure delivery from the pump P' to the driven units M' for reversing the direction of movement of the vehicle.

It is believed that the efficiency of the present system will be relatively high. The efficiency of the units will not drop appreciably until excessive speeds are reached and at such speeds the direct mechanical connection is in. The hydraulic connection is not employed at excessive speeds, and whether or not an efficiency drop would result at excessive speeds is therefore immaterial. The speeds over which the speed change mechanism is operative are not excessive and it is believed that the efficiency over this range will be relatively high.

The direct drive is transmitted solely to the direct mechanical connection so that there is no decreased efficiency at this time and the operation of the hydraulic transmission is entirely automatic, all that is required of the operator or driver being the setting of the dial or disc 165 from his position at the wheel.

A foot pedal 200 (Figure 1) may be employed for opening the valve 112 in the by-pass 114 manually, as desired.

I claim:—

1. In combination, a driving member, a driven member, a fluid transmission between the driving and driven members, comprising a fluid pump operated by the driving member, a fluid motor receiving fluid from said pump and applying power to the driven member, means responsive to certain changes in load for incapacitating and recapacitating said fluid transmission and for varying the relative volumetric displacement thereof, a direct mechanical connection between the driving and driven members, and means for engaging said mechanical connection automatically responsive to the incapacitation of the fluid transmission and for disengaging said mechanical connection responsive to the recapacitation of said fluid transmission.

2. In combination, a driving member, a driven member, a fluid transmission between said driving and driven members comprising a fluid pump operated by the driving member and a fluid motor receiving fluid from said pump and applying power to the driven member, a direct mechanical connection between said members, and means operable with increasing pressures in the fluid transmission from increases in load for disconnecting the direct connection, connecting the fluid transmission and varying the relative volumetric displacement thereof and with decreasing pressures from decreases in load for inversely varying the volumetric displacement of the fluid transmission, disconnecting said fluid transmission and connecting said direct connection.

3. In combination, a driving member, a driven member, a fluid transmission between said driving and driven members comprising a fluid pump operated by the driving member and a fluid motor receiving fluid from said pump and applying power to the driven member, a direct mechanical connection between said members, and means operable with increasing pressures in the fluid transmission from increases in load for disconnecting the direct mechanical connection, connecting the fluid transmission and varying the volumetric displacement thereof and with decreasing pressures from decreases in load for inversely varying the volumetric displacement of the fluid transmission, disconnecting said fluid transmission and connecting said direct connection, and means for preventing disconnection of the direct connection with increased pressures in the fluid transmission at high speeds of the driving member.

4. In combination, a driving member, a driven member, a fluid transmission between said driving and driven members comprising a fluid pump operated by the driving member and motor means for receiving fluid from said pump and applying power to the driven member, means comprising a plurality of serially responsive pressure controlled valves connected to said motor means for automatically varying the relative volumetric displacement of said fluid transmission as a function of the fluid pressure variations in said system, a direct mechanical connection between said driving and driven members, and means for engaging said direct connection automatically responsive to a decrease in pressure in the fluid transmission below a certain value.

5. In combination, a driving member, a driven member, a fluid transmission between said driving and driven members comprising a fluid pump operated by the driving member and a plurality of motor means receiving fluid from said pump and applying power to the driven member, means comprising a plurality of valves connected to said motor means and successively responsive to pressure variations in said system for automatically varying the relative volumetric displacement of said fluid transmission as a function of fluid pressure variations in said system, a direct mechanical connection between said driving and driven members, means for engaging said direct connection automatically responsive to a decrease in pressure in the fluid transmission below a certain value, and means for preventing operation of the fluid transmission with increase pressures at high speeds of the driving member.

6. In combination, a driving member, a driven member, a fluid pump operated by the driving member, a fluid motor unit having connection with the pump for receiving fluid from said pump and applying power to the driven member, a valve in said connection, said valve being controlled by pressure variations in said connection for automatically connecting and disconnecting the motor unit to and from the pump, a direct mechanical connection automatically engaged with the disconnection of said motor unit, a by-pass for freely by-passing the fluid delivery of the pump from the outlet side to the inlet side thereof, and means controlled automatically with variations in load for opening and closing said by-pass.

7. In combination, a driving member, a driven member, a fluid pump operated by the driving member, a fluid motor unit having a stationary fluid connection with the pump for receiving fluid from said pump and applying power to the driven member, said motor comprising a plurality of motor units, and a controlling valve in the connection to each unit, said valve being controlled by pressure variations in the fluid connection from the pump and loaded to open and close at different pressures in said connection, closing of said valve substantially shutting off fluid communication between the pump and motor.

8. In combination, a driving member, a driven member, a fluid pump operated by the driving member, a fluid motor unit having connection with the pump for receiving fluid from said pump and applying power to the driven member, said motor comprising a plurality of motor units, a controlling valve in the connection to each unit, said valve being controlled by pressure variations in the fluid connection and loaded to open and close at different pressures in said connection, a direct mechanical connection between the driving and driven members, and a fluid operated connection between said mechanical connection and the motor units opening first and closing last and operable to engage and disengage said mechanical connection automatically with the closing and opening of said last motor unit.

9. In combination, a driving member, a driven member, a fluid pump operated by the driving member, a fluid motor receiving fluid from said pump and applying power to the driven member, an outlet from said pump to said motor, an inlet to said pump from said motor, a valve in the connection to the motor controlled automatically by pressure variations in said connection, a direct mechanical connection between the driving and driven members, a fluid connection from the motor beyond said valve to said mechanical connection for automatically controlling same, and means controlled by the load upon the driven member and independently of the speed of the driving member for automatically establishing and discontinuing the fluid delivery to the motor and for automatically discontinuing and establishing a local circulation through the pump.

10. In combination, a driving member, a driven member, a fluid pump operated by the driving member, a fluid motor having connection with the pump for receiving fluid from the pump and applying power to the driven member, a control valve for the motor, said valve being interposed in said connection and governed by pressure variations therein, and means for unseating said valve to permit a reversed fluid circulation through said motor.

11. In combination, a driving member, a driven member, means for driving said driven member from said driving member comprising a fluid pump driven by said driving member, a fluid transmission system connected thereto, a plurality of motor means serially connected to said transmission system for driving said driven member, means comprising a plurality of valve members controlling said motor means and successively responsive to increasing or decreasing pressure variations in said transmission system for varying the relative volumetric displacement of said fluid transmission system, a clutch between said driving and driven members, and means controlled by one of said valve members providing for engagement of said clutch when the pressure in said system drops below a certain value.

12. In combination, a driving and a driven member, a fluid pump operated by the driving member, a fluid motor having connection with said pump for receiving fluid from the pump and applying power to the driven member, said motor comprising a plurality of units, a valve for each of said units disposed in said connection and responsive to fluid pressure from said pump, each of said valves having differential pressure-responsive areas whereby each of said valves closes only at a pressure substantially less than the pressure required to open each of said valves to cut off communication to said motor from said pump, and a by-pass for the pump operative only when said valves are closed.

13. In combination, a driving and a driven member, a fluid pump operated by the driving member, a fluid motor having connection with said pump for receiving fluid from the pump and applying power to the driven member, said motor comprising a plurality of units, a valve for each of said units disposed in said connection and responsive to fluid pressure from said pump, each of said valves having differential pressure-responsive areas whereby said valve closes only at a pressure substantially less than the pressure required to open said valve for substantially cutting off communication between said pump and the unit controlled by said valve, a clutch between said driving and driven members, means responsive to closing of the last one of said valves providing for engagement of said clutch to effect direct mechanical connection between said members, said means being re-actuated upon opening of said valve to disengage said clutch, and a by-pass for said pump actuated to its open position by closing of said last-named valve.

14. In a vehicle, a control valve for a motor unit of a fluid transmission system having a fluid pump and a direct driving mechanical connection, a valve housing having an inlet and an outlet adjacent thereto, a valve member for closing said inlet, a piston member of greater area than said valve member carried thereby and reciprocal in said housing upon movement of said valve member, a by-pass connection for said fluid pump operable when said mechanical connection is engaged, and a connection from said by-pass connection to said housing for actuating said piston to maintain said valve closed upon increase in speed of said pump at high vehicle speeds when said by-pass has been opened.

15. In a transmission system having a driving and a driven member, a fluid pump on said driving member, fluid motors actuated by said pump for driving said driven member, and a direct mechanical connection between said members, control means automatically responsive to the pressures set up by said pump for successively actuating said motor units and for engaging said direct mechanical connection, and means carried by said mechanical connection and responsive to centrifugal force for preventing disconnection thereof at high speeds of the driving member.

16. In combination, a driving member, a driven member, a fluid transmission between said members comprising a plurality of successively operated fluid motors driving said driven member, individual control means for each of said motors connected to a common source of fluid pressure, said control means being successively operated by increasing or decreasing pressures occasioned by variations in torque of said driven member to automatically vary the driving ratio between said members, and pressure differential means for preventing fluttering operation of said control means.

HERMAN C. HEATON.